United States Patent [19]
Steffens, Jr. et al.

[11] Patent Number: 5,413,378
[45] Date of Patent: May 9, 1995

[54] METHOD AND APPARATUS FOR CONTROLLING AN ACTUATABLE RESTRAINING DEVICE IN RESPONSE TO DISCRETE CONTROL ZONES

[75] Inventors: Charles E. Steffens, Jr., Washington; Thomas H. Vos, Rochester; Scott B. Gentry, Romeo; Joseph F. Mazur, Washington; Brian K. Blackburn, Rochester, all of Mich.

[73] Assignee: TRW Vehicle Safety Systems Inc., Lyndhurst, Ohio

[21] Appl. No.: 161,654

[22] Filed: Dec. 2, 1993

[51] Int. Cl.⁶ .................. B60R 21/26; B60R 21/28
[52] U.S. Cl. ...................... 280/735; 280/736; 280/739; 180/268
[58] Field of Search ............ 280/735, 734, 730 R, 280/732, 731, 728 R, 739, 736; 180/268, 273, 282

[56] References Cited

U.S. PATENT DOCUMENTS

| | | | |
|---|---|---|---|
| 5,071,160 | 12/1991 | White et al. | 280/735 |
| 5,072,966 | 12/1991 | Nishitake et al. | 280/734 |
| 5,074,583 | 12/1991 | Fujita et al. | 280/735 |
| 5,118,134 | 6/1992 | Mattes et al. | 280/735 |
| 5,172,790 | 12/1992 | Ishikawa et al. | 280/735 |
| 5,174,600 | 12/1992 | Jahn et al. | 180/268 |
| 5,184,845 | 2/1993 | Omura | 280/735 |
| 5,205,582 | 4/1993 | Shiga et al. | 280/735 |
| 5,232,243 | 8/1993 | Blackburn et al. | 280/735 |
| 5,330,226 | 7/1994 | Gentry et al. | 280/735 |

FOREIGN PATENT DOCUMENTS

| | | | |
|---|---|---|---|
| 2516185 | 10/1975 | Germany . | |
| 3802159 | 8/1989 | Germany . | |
| 3809074 | 10/1989 | Germany | 280/728 R |
| 4023109 | 1/1992 | Germany | 280/734 |
| 4137719 | 9/1992 | Germany . | |
| 4214222 | 4/1993 | Germany | 280/728 R |

Primary Examiner—Margaret A. Focarino
Assistant Examiner—Peter C. English
Attorney, Agent, or Firm—Tarolli, Sundheim & Covell

[57] ABSTRACT

An apparatus for controlling an occupant restraint system, such as an air bag (102), includes position sensors (80, 84, 86) for sensing position of an occupant and a weight sensor (70) for sensing weight of the occupant. Both the position sensors (80, 84, 86) and the weight sensor (70) are connected to a controller (24). A seat position sensor (30), a seat back incline sensor (36), and a belt payout sensor (64) are also used to determine occupant weight and position. A vent valve (120) is connected to the reaction can (103) of the air bag (102) and is controlled by the controller (24). The controller (24) establishes an occupant weight range from the weight sensors and an occupant position range from the position sensors. The controller (24) selects one of a plurality of discrete control zones dependant upon both the sensed occupant position range and the sensed occupant weight range. The controller (24) then provides a regulating signal to the vent valve (120) based on the selected one of the discrete control zones.

37 Claims, 4 Drawing Sheets

METHOD AND APPARATUS FOR CONTROLLING AN ACTUATABLE RESTRAINING DEVICE IN RESPONSE TO DISCRETE CONTROL ZONES

TECHNICAL FIELD

The present invention is directed to a vehicle occupant restraint system and is particularly directed to a method and apparatus for controlling an actuatable restraining device.

BACKGROUND OF THE INVENTION

Occupant restraint systems for use in vehicles are well known in the art. One such restraint system includes a crash sensor, an inflatable air bag, and an actuation circuit that controls deployment of the air bag in response to an output from the crash sensor. The crash sensor can be an accelerometer that provides an electrical signal having a value functionally related to the vehicle's deceleration. A controller evaluates the accelerometer signal and provides an actuation signal when it determines a vehicle crash condition is occurring of such nature that the air bag should be deployed. The actuation circuit includes a squib operatively connected to a source of inflation fluid.

In response to an actuation signal from the controller, the actuation circuit applies a current through the squib which causes the squib to ignite. When the squib ignites, the source of inflation fluid discharges gas into the air bag, which results in inflation of the air bag.

The art has recognized that it is not always desirable to inflate the air bag with 100% of the gas provided from the source of inflation fluid. One proposed system controls the amount of gas that inflates the air bag in response to the detected weight of the occupant. Such a system is disclosed in U.S. Pat. No. 5,232,243 to Blackburn et al. and assigned to the assignee of the present invention. Another proposed system, disclosed in Gentry et al., U.S. patent application Ser. No. 986,041, filed Dec. 4, 1992, now U.S. Pat. No. 5,330,226, and assigned to the assignee of the present invention, controls the amount of gas that inflates the air bag in response to detected occupant position.

SUMMARY OF THE INVENTION

The present invention provides a method and apparatus for controlling an occupant restraining device in accordance with a selected control zone which is dependant upon a determined occupant weight range and a determined occupant position range.

In accordance with one aspect of the present invention, an apparatus for controlling an occupant restraint system includes position sensing means for sensing position of an occupant and weight sensing means for sensing weight of the occupant. The apparatus further includes regulating means operatively connected to an occupant restraining device of the occupant restraint system for regulating an occupant restraining function of the occupant restraining device in response to a control signal. Control means is operatively connected to the position sensing means, the weight sensing means, and the regulating means for selecting one of a plurality of discrete control zones dependant upon both the sensed position and the sensed weight of the occupant and for providing the control signal based on the selected one of the discrete control zones.

In accordance with another aspect of the present invention, a method for controlling an occupant restraint system comprises the steps of sensing the position of an occupant and sensing the weight of the occupant. One of a plurality of discrete control zones is selected in response to both the sensed position and sensed weight of the occupant. The method further comprises the step of regulating an occupant restraining function of the occupant restraint system based on the selected control zone.

In accordance with a preferred embodiment of the present invention, an apparatus is provided for controlling an air bag operatively coupled to a source of inflation fluid. The air bag is inflated to an operative restraining position upon detection of a vehicle crash condition. The apparatus includes position sensing means for sensing position of an occupant relative to the air bag and weight sensing means for sensing weight of the occupant. The apparatus further includes regulating means operatively connected to the air bag for venting off an amount of inflation fluid so as to regulate the restraining function of the air bag during a vehicle crash condition in response to a regulating control signal. Control means is operatively connected to the position sensing means, the weight sensing means, and to the regulating means for selecting one of a plurality of discrete control zones dependant upon both the sensed position and the sensed weight of the occupant and for providing the control signal based on the selected one of the discrete control zones. The control means includes a look-up memory table having a plurality of stored occupant characterization blocks wherein each block is functionally related to both an occupant weight range and an occupant position range. The plurality of stored blocks are grouped into at least two discrete control zones. Each of the control zones has an associated regulating control signal. The control means outputs an associated one of the regulating control signals based on the selected control zone which results in control of the amount of inflation fluid vented.

BRIEF DESCRIPTION OF THE DRAWINGS

Other features and advantages of the present invention will become apparent to those skilled in the art to which the present invention relates from a reading of the following detailed description of a preferred embodiment with reference to the accompanying drawings, in which.

DESCRIPTION OF PREFERRED EMBODIMENTS

Figure 1:
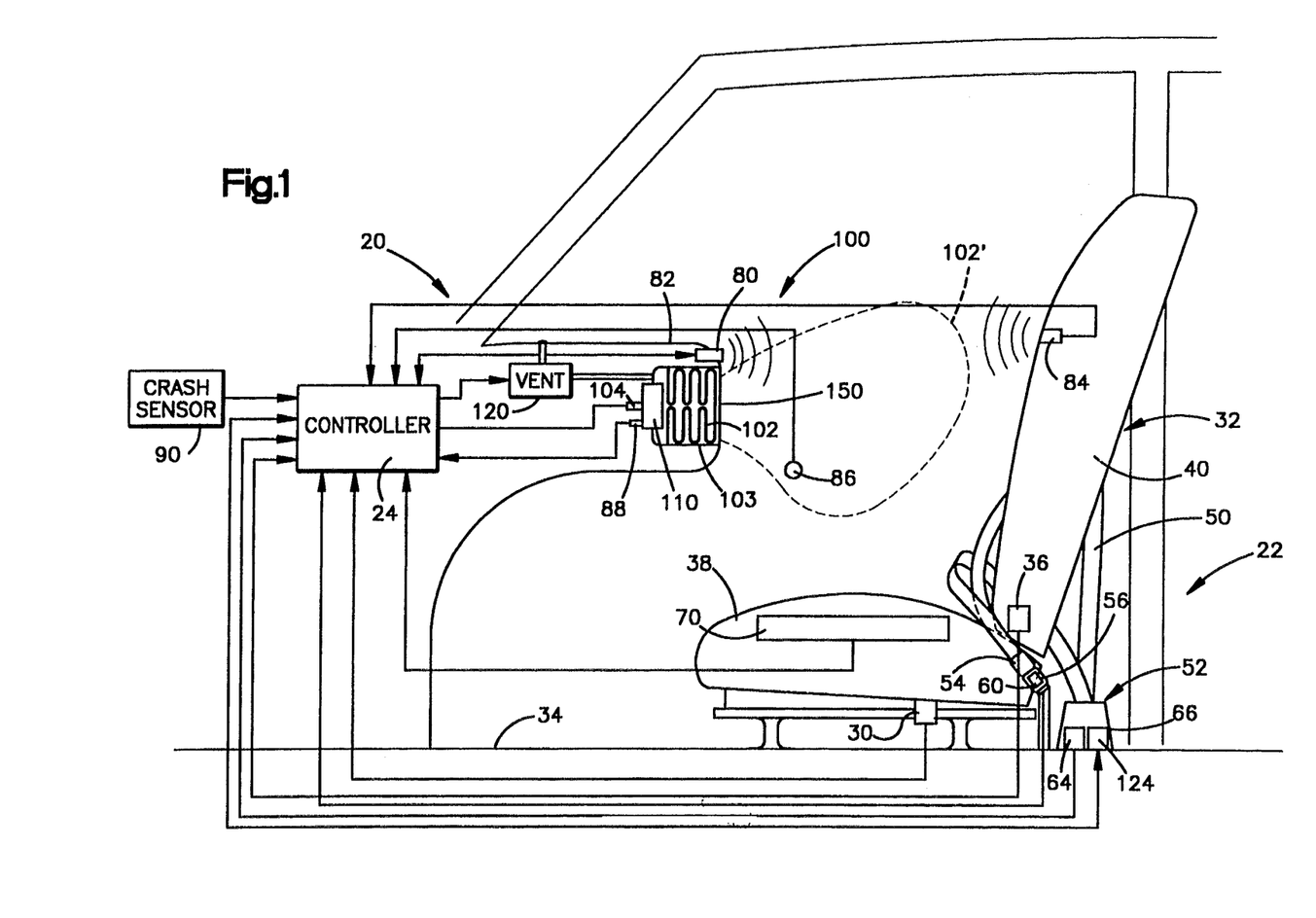
FIG. 1 is a schematic diagram of an occupant restraint system made in accordance with the present invention.
Figure 2:
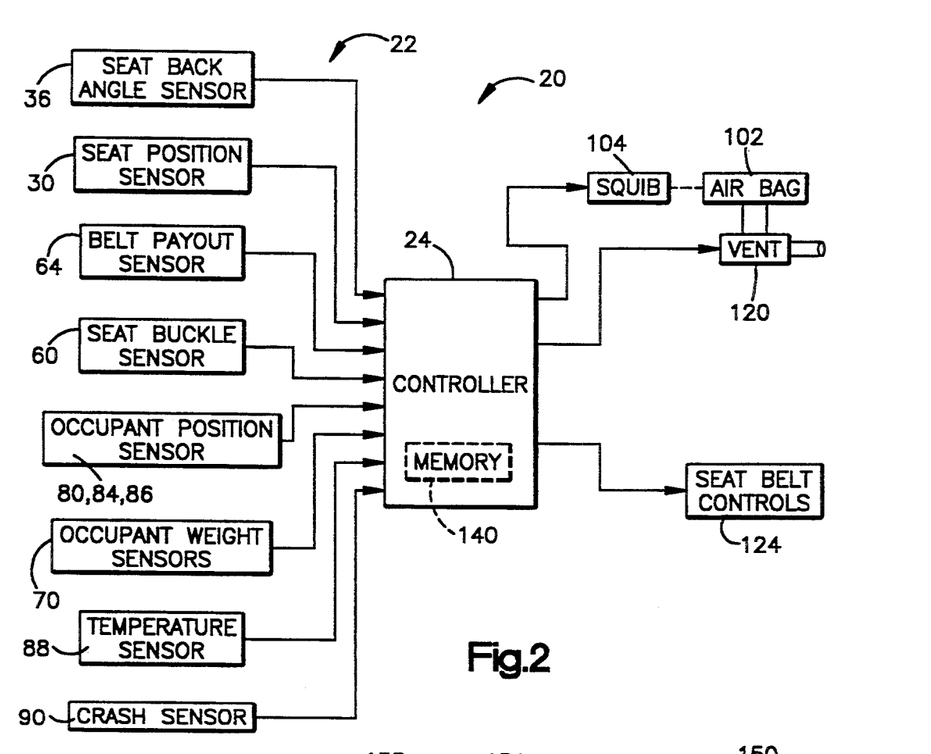
FIG. 2 is a schematic block diagram of the electrical control portion of the system shown in FIG. 1.

Referring to FIGS. 1 and 2, an apparatus 20 for controlling an occupant restraint system includes a plurality of sensors 22 operatively connected to a controller 24. Specifically, a seat position sensor 30 is operatively connected between a vehicle seat 32 and the vehicle floor 34 and is electrically connected to the controller 24. The sensor 30 provides an electrical signal indicative of the position of the seat 32 relative to a fixed reference point in the interior of the vehicle interior. A seat back angle sensor 36 is operatively connected between a seat bottom 38 and the seat back 40 of seat 32 and is electrically connected to the controller 24. The seat back angle sensor 36 provides an electrical signal indicative of the angle of inclination of the seat back 40 relative to the seat bottom 38.

A seat belt 50 is operatively secured to the vehicle 34 at a first location 52 in a known manner. It is also contemplated that the seat belt 50 may be secured to the vehicle seat 32. When strapped around the occupant, one end 54 of the seat belt is received in and secured to a seat belt buckle 56 assembly using a tongue and buckle arrangement well known in the art. The buckle portion of the seat belt buckle assembly is secured to the vehicle 34 in a known manner. It is also contemplated that the seat belt buckle assembly can be secured to the vehicle seat 32. The seat belt buckle assembly 56 includes a seat belt buckle switch 60 electrically connected to the controller 24. The seat belt buckle switch 60 provides an electrical signal to the controller 24 indicative of whether the seat belt tongue and buckle are in a latched condition. A web or belt payout sensor 64 is operatively connected to a seat belt retractor 66 and is electrically connected to the controller 24. The payout sensor 64 provides an electrical signal indicative of the amount of seat belt webbing 50 that has been pulled from the retractor 66.

An occupant weight sensor or scale 70 is operatively mounted in the bottom cushion 38 of the seat 32 and is electrically connected to the controller 24. The weight sensor 70 provides an electrical signal indicative of a measured weight of an object located on the seat cushion 38. A first occupant position sensor 80, such as an ultrasonic sensor, is mounted in the dashboard or instrument panel 82 aimed toward the seat back 40 and is electrically connected to the controller 24. A second position sensor 84, also an ultrasonic sensor, is mounted in the back portion 40 of the seat 32 aimed toward the front of the vehicle and is electrically connected to the controller 24. A third position sensor 86, also an ultrasonic sensor, is preferably mounted in the side door forward of a normal occupant sitting location and aimed sideways across the vehicle and is electrically connected to the controller 24. The sensors 80, 84, 86 are used to determine the occupant position relative to the deployment door or cover 150 of an inflatable occupant restraint system 100. It is contemplated that other types of sensors can be used to monitor position and that other locations of the sensors could be used.

When the controller actuates the ultrasonic sensors 80, 84, 86, each one outputs an associated ultrasonic pulse. The sensors 80, 84, 86 may be transponders or can be made up of a transmitter/receiver pair. Each of the sensors provides an electrical signal indicative of an associated return echo pulse in a manner well known in the art. By monitoring the time duration between a transmitted pulse and a received echo pulse, the controller 24 determines the position of an occupant relative to each of the sensors. Since the controller "knows" the location of the sensors relative to the deployment door or cover 150 of the inflatable occupant restraint system 100, the controller can determine the position of the occupant relative to the deployment door 150 using simple mathematics. The controller 24 compensates the values of the distances measured by the front sensor 80 and rear sensor 84 based on seat position as sensed by sensor 30 and seat incline as sensed by sensor 36.

The front sensor 80 directs an ultrasonic pulse toward the front of the occupant. Based on the time duration between the transmitted pulse and the received echo pulse, the controller 24 determines the distance from the front of the occupant to the dashboard 82. The seat ultrasonic sensor 84 directs a pulse toward the occupant's back. Based on the time duration between the transmitted pulse and the received echo pulse, the controller 24 determines the distance from the occupant's back to the seat back 40. The sensor 86 functions as an assurance sensor to determine if the occupant is within a predetermined distance of the deployment door 150 of the inflatable occupant restraint system 100. Using the computed distance from the occupant to the front sensor 80, the computed distance from the occupant's back to the seat back 40 (to sensor 84), the seat position from sensor 30, the seat incline angle from sensor 36, the seat belt webbing payout from sensor 64, and the return from sensor 86, the controller 24 can compute the occupant's position relative to the deployment door 150 of the inflatable occupant restraint system 100.

A vehicle crash sensor 90 is mounted to the vehicle and is electrically connected to the controller 24. The crash sensor 90 may take any one of many several forms, including an inertia switch. Preferably, the crash sensor 90 is an accelerometer of the type that outputs an electrical signal having a characteristic indicative of a vehicle crash condition upon the occurrence of a crash condition. The controller 24 analyzes the output signal from the accelerometer and determines if a deployment crash condition is occurring. A deployment crash condition is one in which deployment of the air bag is desired to enhance the restraining function for the occupant. A non-deployment condition is one in which the seat belts alone are sufficient to provide an adequate restraining function for the occupant.

The inflatable occupant restraint system or air bag assembly 100 includes an air bag 102 operatively mounted in a housing or reaction can 103 which is, in turn, mounted in the dashboard or instrument panel 82. The controller 24 is electrically connected to a squib 104 which is, in turn, operatively connected to an inflator 110. The inflator 110 is operatively connected to the air bag 102 so that when the controller ignites the squib 104, inflation fluid, preferably an inert gas, is released from the inflator 110. The air bag 102 is then inflated to its operative position 102′ shown in FIG. 1.

A temperature sensor 88 is mounted to the inflator 110 and is electrically connected to the controller 24. The temperature sensor 88 provides an electrical signal to the controller 24 indicative of the temperature of the inflator 110.

An electrically controlled venting device 120, such as a valve, is operatively connected to the reaction can 103 and is electrically connected to the controller 24. The controller 24 controls the venting device 120 to control the amount of gas that flows out through the vent, thereby controlling the pressure of the gas in the air bag 102. The controller 24 controls the venting device 120 in response to the sensors 22.

The source of inflation fluid 110 provides a predetermined amount of gas, referred to herein as 100% of the possible gas. The controller 24 controls the venting device 120 to vent away a portion of the gas from the air bag. The amount of inflation fluid that is directed away from the air bag 102 by the venting device 120 is determined by the extent to which the venting device 120 is opened in response to the control signal from the controller 24. Those skilled in the art will appreciate that control of the amount of gas in the air bag 102 can be accomplished in other ways, such as providing a plurality of sources of inflation fluid and controlling the number of sources actuated.

The controller 24 is also electrically connected to seat belt controls 124, such as a seat belt load limiter. The controller 24 controls the seat belt controls 124 in response to the outputs from the sensors 22.

Figure 3:
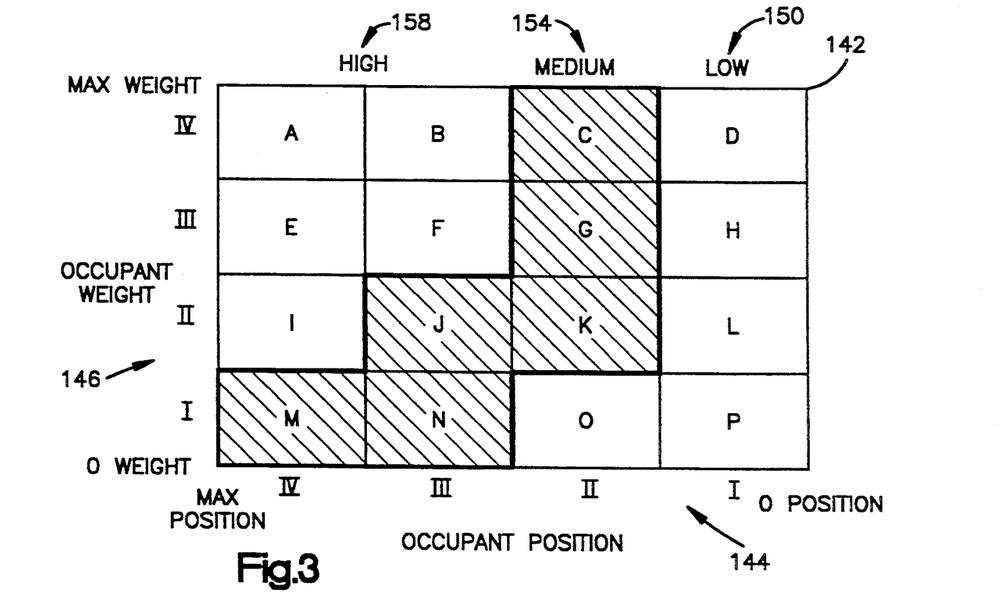
FIG. 3 is a schematic depiction of a look-up table portion of the controller of FIG. 1 showing control zone groups.

Referring now to FIGS. 2 and 3, the controller 24, which is preferably a microcomputer, includes a memory location 140 for storing a look-up table 142. The look-up table is divided into a plurality of occupant position ranges 144 and a plurality of occupant weight ranges 146. With regard to the occupant position ranges 144, for the purposes of discussion, the distance between the deployment door or cover 150 of the air bag assembly 100 and the seat 32 when it is in its rearwardmost upright location, i.e., the maximum anticipated distance, is divided into four ranges. If the occupant is in a first range between a zero distance, i.e., against the door 150 of the air bag assembly 100, and about 10% of the maximum distance, the occupant is said to be in a first position range designated I. When the occupant is in a position greater than about 10% and not more than about 30% of the maximum anticipated distance from door 150, the occupant is in position range II. When the occupant is in a position greater than about 30% and not more than about 60% of the maximum anticipated distance from door 150, the occupant is in position range III. When the occupant is in a position greater than about 60% of the maximum anticipated distance from door 150, the occupant is in occupant position range IV.

The occupant weight is divided, for the purposes of discussion, into four weight ranges between zero weight and a maximum predetermined weight. An occupant weighing more than the maximum predetermined weight will be characterized as being in the maximum weight range. When an occupant's weight is between 0 and about 25% of the maximum predetermined weight value, the occupant is said to be in occupant weight range I. When the occupant's weight is greater than about 25% and not more than about 50% of the maximum predetermined weight, the occupant's weight is said to be in occupant weight range II. When the occupant's weight is greater than about 50% and not more than about 75% of the maximum predetermined weight, the occupant's weight is said to be in occupant weight range one III. When the occupant's weight is greater than about 75% of the maximum predetermined weight, the occupant's weight is said to be in occupant weight range IV.

The four occupant weight ranges and position ranges form a 4×4 matrix that provides 16 occupant characterization blocks labelled A–P. These 16 occupant characterization blocks are grouped into three control zones. Blocks D, H, L, P, and O are designated as a low control zone 150. Blocks C, G, J, K, M, and N are designated as a medium control zone 154. Blocks A, B, E, F and I are designated as a high control zone 158. The control zones 150, 154, 158 are used by the controller 24 to control the venting device 120.

These control zones are based upon the amount of pressure needed in the air bag 102 to restrain the occupant by dissipating the occupant's kinetic energy during a crash event and upon the amount of distance available for the bag 102 to stop the occupant's forward motion before the occupant strikes the dashboard 82. During a crash event, the occupant has a kinetic energy equal to $\frac{1}{2} mv^2$. M is the mass of the occupant and v is the velocity at which the occupant is moving relative to the vehicle's interior. V is a function of the crash severity and requires a dynamic determination from the crash sensor output signal. The occupant's position and weight can be continuously monitored to enable the venting device 120 to be adjusted prior to the occurrence of a crash event.

The work required to restrain an occupant during a crash event is equal to the occupant's kinetic energy. Work is defined as force times distance. Force is the force imparted by the restraint system, and distance is the distance over which the force can be imparted. The matrix of FIG. 3 considers both weight and distance and establishes three separate air bag pressures. By selecting a desired air bag pressure based upon measurements and determinations made prior to the occurrence of a crash event, the venting device is set in advance of a vehicle crash. The matrix approach permits simplicity in data manipulation to establish a control value.

When an occupant's weight and position places the occupant in the low control zone 150, the venting device is opened a first amount to vent a first amount of gas, such as approximately 50% of the possible gas. When an occupant's weight and position places him in the medium control zone 154, the venting device is opened a second amount to vent a second amount of gas, such as approximately 25% of the possible gas. If an occupant's weight and position places him in the high control zone 158, the controller closes the venting device so as to not vent any of the gas.

Referring to FIGS. 4 through 9, the control process in accordance with the present invention will be better appreciated. The control process begins with step 200 which occurs at power-up of the vehicle. In step 200, all internal states of the controller 24 are set to predetermined initial values. The controller proceeds to step 202 where a determination is made as to whether the occupant has his seat belt buckled. This is determined by the controller 24 monitoring the seat belt buckle sensor 60. If the determination in step 202 is affirmative, the process stores that information in memory for later use and then proceeds to step 204 where the controller 24 samples the occupant weight sensor or scale 70, the seat back incline sensor 36, and the belt payout sensor 64. The sampled values are stored in an internal memory of the controller 24 for later use.

In step 206, the controller 24 determines the weight range into which the occupant's weight falls. To determine the weight range of the occupant, the controller 24 follows a process designated by step 208 of FIG. 4 and shown in detail in FIG. 5. In step 210, the controller reads the seat incline angle value that was stored in memory back in step 204. The occupant's measured weight upon the seat as "seen" by the weight sensor 70 is functionally related to the incline angle of the back portion 40 of the seat 32. As the seat incline angle is increased toward a reclining position, more of the occupant's weight is transferred to the seat back 40 of the seat 32. This weight transfer is reflected in a decreased reading from the weight sensor 70. By using empirically determined data based upon a sampling of many occupants of various weights and heights, and taking into account various angles of incline of the seat back 40, weight compensation values for all seat incline angles are prestored in the controller 24.

Figure 5:
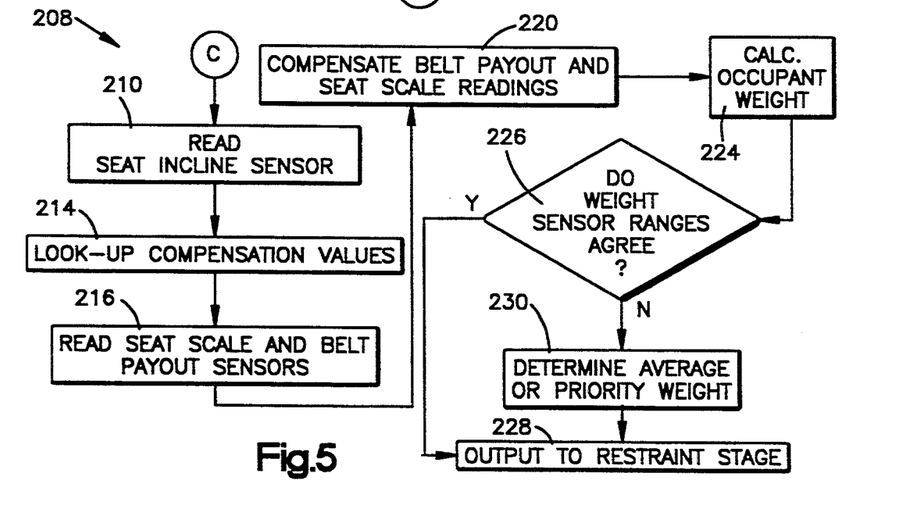

Occupant weight can also be determined using belt payout. As with the occupant weight sensor 70, the value of the belt payout sensor 64 will be functionally related to the incline angle of the seat back 40. Again, empirical testing provides weight compensation values for belt payout based upon the incline angle of the back portion 40 of the seat 32.

In step 214, the controller 24 reads the compensation values that are dependent upon the measured angle of incline of the seat back 40. In step 216, the value of the weight sensor 70 and the value of the belt payout sensor 64 stored in step 204 are read by the controller 24. In step 220, the values of the seat scale or weight sensor 70 and the value of the belt payout sensor 64 are adjusted using the compensation values read in step 214.

In step 224, the occupant's actual weight is calculated in two separate ways. First, the occupant's weight is calculated based upon the compensated value of the weight sensor 70. Second, the occupant's weight is calculated depending on the compensated seat belt payout value. Those skilled in the art will appreciate that the two weight values can either be calculated using a predetermined formula or can be determined using look-up tables. In accordance with a preferred embodiment, the weight values determined in step 224 are the weight ranges shown in FIG. 3. The two determinations made are determinations as to which of the four weight ranges includes the occupant's weight.

In step 226, a determination is made as to whether the two calculated weight values, i.e., weight ranges, are in agreement. If the determination is affirmative, the process proceeds to step 228 where the occupant's weight range is output to and stored in memory of the controller 24 for later use in the look-up table of FIG. 3. If the determination in step 226 is negative, the process proceeds to step 230 where an averaging of the two determined weight ranges is established or a weight range based on priority of sensors is selected.

If the weight determination based on weight sensor 70 is that the occupant is in range IV and the weight determination based on the belt payout sensor 64 is that the occupant is in weight range II, an average of weight range III is established in step 230 and output in step 228. If, however, the weight determination based on weight sensor 70 is that the occupant's weight is in range IV and the weight determination based on the belt payout sensor 64 is that the occupant weight is in range III, the weight sensor 70 determination is given priority as being more likely to be correct. In such a situation, the weight range IV would be output in the step 228 to establish the occupant's weight as being in range IV. Whenever the calculation step 224 determines that the weight ranges are different but are adjacent weight ranges, the weight sensor 70 is always given priority as being more likely to be correct.

Referring back to FIG. 4, after the weight range is determined, the process proceeds to step 240 where the controller 24 samples the occupant position sensors 80, 84, 86, and the sampled values are stored in an internal memory of the controller 24 for later use. The process proceeds to step 242 where the seat belt payout sensor 64, the seat position sensor 30, and the seat incline sensors 36 are sampled, and the sampled values are stored in an internal memory of the controller 24 for later use. In step 246, the occupant's position range is determined. To determine the position range in which the occupant resides, the controller 24 follows several process steps designated by step 248 of FIG. 4 and shown in detail in FIG. 6.

Figures 6, 7, 8, 9:
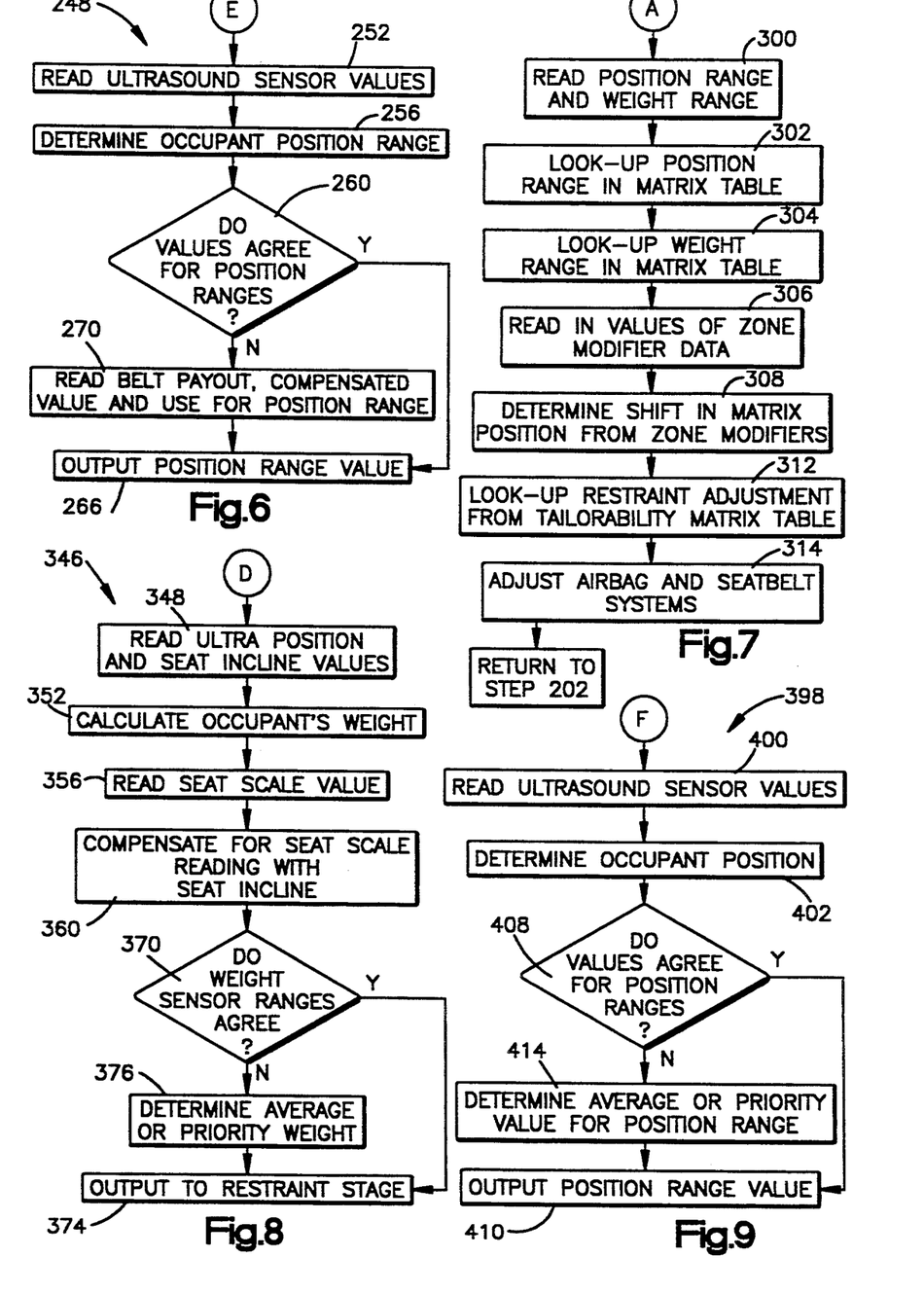

Referring to FIG. 6, the values of the ultrasound sensors 80, 84, 86 which were stored in step 240 are read out of memory in step 252 by the controller 24. The occupant's position range relative to the deployment door 150 of the air bag system 100 is determined in step 256 from each of the three sensors 80, 84, 86. A determination is made in step 260 as to whether the position ranges determined from the three independent sensors are in agreement.

If the determination in step 260 is affirmative, a value of the occupant's position range is output in step 266. If the determination in step 260 is negative, the process proceeds to step 270 where the controller 24 reads the belt payout sensor 64. Occupant position based on belt payout must be compensated for in response to seat incline and seat position. To establish compensated values for storage in a look-up table, several samplings are taken of occupants sitting in different positions on a vehicle seat with the seat moved to different positions and positioned with different inclines. The controller determines the occupant position range from the compensated belt payout value preferably from a look-up table. The determined occupant position range from the compensated belt payout is output to and stored in memory of the controller 24 as the occupant position range value in step 266. Occupant position range based on either the ultrasonic sensors or the belt payout can be either calculated or obtained using a look-up table.

After the occupant weight range is determined and the occupant position range is determined, the process proceeds to a control process (designated as "A") to tailor or control the venting device 120 to, in turn, control the pressure in the air bag 102. Controlling the amount of inflation fluid controls pressure of the fluid in the air bag 102. The inflation pressure of the air bag 102 affects the response of the air bag to the occupant during a vehicle crash condition.

The process proceeds to step 300, as shown in FIG. 7, where the occupant's position range and the occupant's weight range are read. Using the occupant's position range (step 302) and occupant's weight range (step 304), an occupant characterization block is selected or determined from the matrix (FIG. 3). Assume that an occupant is in a weight range III and a position range II. The occupant would then be in the G occupant characterization block of the matrix shown in FIG. 3, which falls within the medium control zone 154. Other factors in the system may move an occupant's selected or determined control zone location on the matrix of FIG. 3 from one location to another location.

In step 306, the controller 24 reads the sensors that may modify a selected or determined control zone for the occupant. One such zone modifier sensor may be the temperature sensor 88. When the temperature sensor senses that the inflator 110 is colder than a predetermined value such as −10° F., it is known that the output from the inflation fluid source would normally be lower. Therefore, in such a cold environment, it is desirable to provide more inflation fluid to the air bag. Therefore, if the temperature is sensed as being −10° F. or less, the controller 24 shifts the selected or determined occupant characterization block one block to the left as shown in FIG. 3.

In the above example where the occupant is determined to be in block G, which results in a medium control zone, the controller would shift the occupant characterization block to block F, which is in the high control zone 158. This would result in more gas being provided to the air bag 102 during inflation. Similarly, if a high inflator temperature is sensed, the controller 24 would shift the occupant characterization block one to the right, which may result in a control zone shift.

Another contemplated zone modifier is crash velocity. Crash velocity is determined by integrating the output signal from the accelerometer crash sensor 90. As the determined crash velocity increases, it is desirable to have more gas inflating the air bag. For low crash velocities, it is desirable to have less gas inflating the air bag. Assume that the occupant is determined to be in occupant characterization block G. If the crash velocity is below a first predetermined level defining a boundary of a low intensity or low velocity crash, the controller would shift the occupant characterization block to block H. This would result in less gas being provided to inflate the air bag 102. If the crash velocity is greater than a second predetermined level defining a boundary of a high intensity or high velocity crash, the controller would shift the occupant characterization block to block F. This would result in more gas being provided to inflate the air bag 102.

The seat belt buckle sensor 60 may also be used as a zone modifier. Assume that the occupant weight and position are determined without use of a belt payout measurement. Depending on the occupant characterization block into which the occupant falls, it may be desirable to increase pressure in the air bag 102. It is contemplated that an unbuckled condition would result in a shift upward of one block in the control matrix of FIG. 3. Assume an occupant's determined occupant characterization block is J. If the occupant is not wearing his seat belt, i.e., the buckle is unbuckled, the controller would shift the characterization block up one to block F. This would move the control zone from the medium zone to the high zone.

In step 308, the controller 24 makes a determination whether or not a control zone shift is necessary from the values of the zone modifiers read in step 306. In step 312, the actual control zone is determined, taking into account whether or not a control zone shift is required. Once the control zone is determined in step 312, the controller uses the determined control zone value to control the venting device 120 which, in turn, controls pressure in the air bag upon the occurrence of a vehicle crash condition. It is also contemplated that the controller 24 can control the seat belt controls 124 upon the occurrence of a vehicle crash condition. Those skilled in the art will appreciate that this is a continuous control process. Once control values are set in step 314, the process returns to step 202. Depending on changes in sensor outputs, the control values may or may not change in time.

One particular type of seat belt control 124 is a load limiter. The amount of load that the load limiter allows in the seat belt is preferably divided into three separate control zones, namely, a low load, medium load, and high load similar to that shown in FIG. 3. Other contemplated seat belt controls 124 include a D-ring height adjuster and a seat belt pretensioner.

Referring back to FIG. 4, if the determination in step 202 as to whether the occupant has his seat belt buckled is negative, the process proceeds to step 340. In step 340, the seat occupant weight sensor 70 is sampled and the seat incline sensor 36 is sampled. As in step 204, these sampled readings are stored in a memory internal to the controller 24 for later use in the control process. The process then proceeds to step 344 where the occupant's weight is determined. The determination of the occupant's weight when the seat belt is not buckled requires a plurality of steps indicated by step 346 of FIG. 4 and shown in detail in FIG. 8.

Referring to FIG. 8, in step 348, the controller 24 reads the values of the ultrasonic sensors 80, 84, 86 and the value of the seat incline as sensed by sensor 36. These values are stored in the internal memory of the controller 24. Based on the ultrasonic values from step 348, the controller 24, in step 352, calculates the occupant's weight. The weight determination in step 352 is weight range. This value can either be calculated or can be determined from a prestored look-up table based upon samplings of several occupants on the vehicle seat and different seat inclines.

In step 356, the controller 24 reads the stored value from the weight sensor 70. The value from the weight sensor read in step 356 is compensated for or adjusted in step 360 by the readings of the incline of the seat back 40, as sensed by the incline sensor 36. As discussed above, the weight measured by the weight sensor 70 is functionally dependent on the incline of the seat back 40. The weight determination in step 360 is a weight range.

In step 370, a determination is made as to whether the occupant's weight range determined in step 352 is equal to the compensated weight range determination in step 360. If the determination in step 370 is affirmative, the process proceeds to step 374 where the occupant's weight range is output and stored in an internal memory within the controller 24. If the determination in step 370 is negative, the process proceeds to step 376 where the occupant's average or priority weight range is determined. Referring back to FIG. 3, if the occupant's weight range determined in step 352 is weight range II, and the weight range determined in step 360 is weight range IV, the average weight range III would be determined in step 376 and output to step 374. If the weight ranges determined in step 352 and step 360 are in adjacent blocks, the weight range based on the weight sensor is given priority and the weight range determined in step 360 would be output in step 374.

Figure 4:
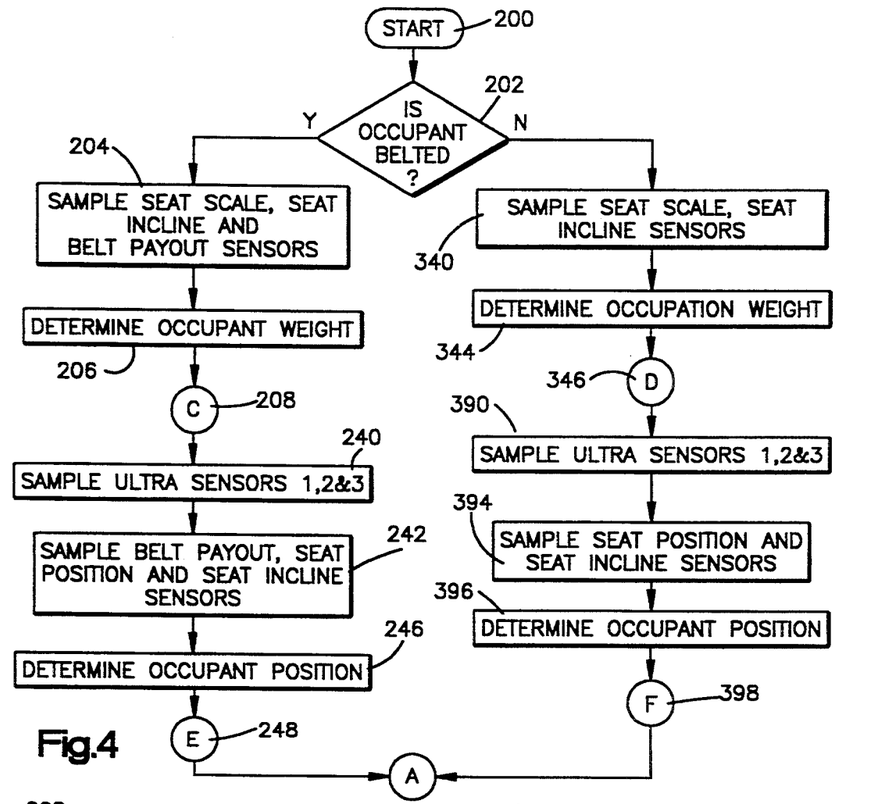
FIGS. 4–9 are flow charts showing a control process in accordance with the present invention.

For example, if the occupant's weight range is determined to be weight range III as determined in step 352, and the occupant's weight range as determined in step 360 is weight range IV, the weight determination using the weight sensor 70, i.e., weight range IV, is given priority. Weight range IV is therefore output and stored in memory in step 374. Once the occupant's weight range is established in step 374, the process proceeds to step 390 (FIG. 4).

In step 390, the three ultrasonic sensors 80, 84, 86 are sampled, and their sampled values are stored in an internal memory of the controller 24 for later use.

The process proceeds to step 394 where the seat position sensor 30 and the seat incline sensor 36 are sampled and the sample values stored for later use. In step 396, the occupant position is determined. The determination of step 396 requires several process steps designated as step 398 of FIG. 4 and shown in detail in FIG. 9.

Referring to FIG. 9, the process proceeds to step 400 where the stored values of the ultrasonic sensors 80, 84 and 86 are read. In step 402, occupant position ranges are separately determined for each of the ultrasonic readings. A determination is made in step 408 as to whether the determined occupant position ranges determined in step 402 are the same. If the determination is affirmative, the position range value is output and stored for later use in step 410. If the determination of step 408 is negative, the average or priority position range is determined in step 414. If the determined position ranges have a block in between, the average range is selected. If the blocks are adjacent, priority is given to a position determination based on the back sensors 84. The determined position range is output and stored in an internal memory of the controller 24 for later use in step 410.

After the weight range and position range for the occupant are determined using steps 340–414, the process proceeds to step 300 and the control process is completed in the exact manner as described above with regard to FIG. 7.

This invention has been described with reference to preferred embodiments. Modifications and alterations may occur to others upon reading and understanding this specification. For example, control of the gas pressure in the air bag 102 or control of a seat belt control 124, such as a load limiter, has been described in response to the determined control zone. It is contemplated that other controllable safety devices may be controlled in response to the determined control zones of the present invention. Such devices include retractor or D-ring pretensioners, adjustable web clamps, variably controlled knee blockers, and controllable seats. Controllable seats include those that controllably move to prevent "submarining" of the occupant, those that have variable bladders, and those that have variably controlled energy-absorbing portions. In addition to the control of venting of an air bag as described above, it is contemplated that ignition timing can be controlled, that multi-rate inflators can be controlled, that the throttling of the inflator or an associate diffuser can be controlled, and that the air bag can be aimed in response to the determined control zone. It is intended to include all such modifications and alterations insofar as they come within the scope of the appended claims and the equivalents thereof.

Having fully described the invention, the following is claimed:

1. An apparatus for controlling an occupant restraint system, said apparatus comprising:
    position sensing means for sensing position of an occupant;
    weight sensing means for sensing weight of the occupant;
    regulating means operatively connected to an occupant restraining device of the occupant restraint system for regulating an occupant restraining function of said occupant restraining device in response to a control signal; and
    control means operatively connected to said position sensing means, to said weight sensing means, and to said regulating means and including (i) means for determining in which of a plurality of discrete occupant weight ranges the occupant's sensed weight falls, and (ii) means for determining in which of a plurality of discrete occupant position ranges the occupant's sensed position falls, said control means selecting one of a plurality of discrete control zones dependant upon both said determined discrete occupant position range and said determined discrete occupant weight range of the occupant and providing said control signal based on the selected one of said discrete control zones.

2. The apparatus of claim 1 wherein said control means includes a look-up table having a matrix of occupant characterization blocks, each occupant characterization block being defined by one of said weight ranges and one of said position ranges, said occupant characterization blocks being grouped to define said control zones.

3. The apparatus of claim 2 wherein said means for determining in which of a plurality of discrete occupant position ranges the occupant's sensed position falls includes means for determining when the occupant is between 0% and about 10% of a maximum possible distance from the vehicle dashboard, when an occupant is more than about 10% and not more than about 30% of the maximum possible distance from the vehicle dashboard, when the occupant is more than about 30% and not more than about 60% of the maximum possible distance from the vehicle dashboard, and when the occupant is more than about 60% of the maximum possible distance from the vehicle dashboard.

4. The apparatus of claim 1 including zone modifying means for modifying said selected one of said control zones in response to a zone modifier.

5. The apparatus of claim 4 wherein said restraint system includes an air bag assembly and wherein said zone modifying means includes means for sensing a condition of the air bag assembly, said selected one of said control zones being modified, if necessary, in response to the sensed condition of the air bag assembly.

6. The apparatus of claim 5 wherein said air bag assembly includes an inflator and wherein said means for sensing said condition of the air bag assembly includes means for sensing the temperature of the inflator.

7. The apparatus of claim 4 wherein said modifying means includes means for sensing whether an occupant has fastened his seat belt and wherein said selected one of said control zones is modified if said seat belt is sensed as not being fastened.

8. The apparatus of claim 1 wherein said restraining system includes an inflatable air bag operatively coupled to a source of inflation fluid, said air bag being inflated to an operative restraining position upon detection of a vehicle crash condition and wherein said regulating means includes means for venting a predetermined amount of inflation fluid away from said air bag so as to control the restraining function of said air bag during a vehicle crash condition.

9. The apparatus of claim 1 wherein said weight sensing means includes a weight sensor in the occupant seat operatively connected to said control means.

10. The apparatus of claim 9 further including a seat back incline sensor and wherein said control means includes means for compensating a value output from said weight sensing means as a function of an output from said seat back incline sensor.

11. The apparatus of claim 1 wherein said weight sensing means includes a plurality of weight determining means for determining an occupant weight value and wherein said control means includes means for establishing said occupant weight range based on outputs of the plurality of said weight determining means.

12. The apparatus of claim 1 wherein said position sensing means includes a plurality of position sensors for sensing position of the occupant and wherein said control means includes means for establishing said occupant position range based on outputs from said plurality of position sensors.

13. The apparatus of claim 12 wherein said plurality of position sensors includes a first ultrasonic sensor connected to said control means and located in a dashboard of the vehicle so as to be rearward facing and a second ultrasonic sensor connected to said control means and located in the vehicle seat so as to be forward facing.

14. The apparatus of claim 13 further including seat position sensing means for sensing the position of the occupant seat and wherein said control means includes means to compensate distance measurements made by said first and second ultrasonic sensors in response to said sensed seat position.

15. The apparatus of claim 1 wherein said weight sensing means includes a plurality of weight determining means, each weight determining means determining an occupant weight range and wherein said control means includes means for establishing a priority of a determined weight range upon the occurrence of a discrepancy in determined weight ranges between said plurality of weight determining means.

16. The apparatus of claim 1 wherein said position sensing means includes a plurality of position sensors and wherein said control means includes means for establishing a position range for each position sensor and means for establishing a priority range upon the occurrence of a discrepancy in established ranges from said plurality of position sensors.

17. The apparatus of claim 1 wherein said restraining system includes a seat belt and wherein said regulating means includes means for regulating the operation of the seat belt.

18. A method for controlling an occupant restraint system comprising the step of:
sensing the position of an occupant;
sensing the weight of the occupant;
determining in which of a plurality of discrete occupant weight ranges the occupant's sensed weight falls;
determining in which of a plurality of discrete occupant position ranges the occupant's sensed position falls;
selecting one of a plurality of discrete predetermined control zones dependant upon both said determined discrete occupant position range and said determined discrete occupant weight range of the occupant;
providing a control signal based on the selected one of said discrete control zones; and
regulating an occupant restraining function of said occupant restraint system in response to said control signal.

19. The method of claim 18 further including providing a look-up table having a matrix of occupant characterization blocks, each occupant characterization block being defined by one of said weight ranges and one of said position ranges, and grouping said occupant characterization blocks into said control zones.

20. The method of claim 19 wherein the step of determining in which of a plurality of discrete occupant position ranges the occupant's sensed position falls includes the steps of determining if the occupant's position is between 0% and about 10% of a maximum possible distance from the vehicle dashboard, determining if the occupant's position is more than about 10% and not more than about 30% of the maximum possible distance from the vehicle dashboard, determining if the occupant's position is more than about 30% and not more than about 60% of the maximum possible distance from the vehicle dashboard, and determining if the occupant's position is more than about 60% of the maximum possible distance from the vehicle dashboard.

21. The method of claim 18 further including the steps of sensing a zone modifier and modifying said selected control zone in response to the sensed zone modifier.

22. The method of claim 21 wherein said restraint system includes an air bag assembly and wherein said step of sensing a zone modifier includes sensing a condition of the air bag assembly, and said step of modifying said selected control zone includes modifying said selected control zone in response to said sensed condition of the air bag assembly.

23. The method of claim 22 wherein said air bag assembly includes an inflator and wherein said step of sensing said condition of the air bag assembly includes sensing the temperature of the inflator.

24. The method of claim 18 wherein said restraining system includes an inflatable air bag operatively coupled to a source of inflation fluid, said air bag being inflated to an operative restraining position upon detection of a vehicle crash condition and wherein said step of regulating includes venting a predetermined amount of inflation fluid away from said air bag so as to control the restraining function of said air bag during a vehicle crash condition.

25. The method of claim 18 wherein said step of sensing the weight of the occupant includes mounting a weight sensor in an occupant seat.

26. The method of claim 25 further including the steps of mounting a seat back incline sensor to the occupant seat and compensating a value output from said weight sensing means as a function of an output from said seat back incline sensor.

27. The method of claim 18 wherein the system further includes a plurality of weight sensors wherein said step of sensing occupant weight includes establishing a weight range based on said plurality of weight sensors.

28. The method of claim 18 wherein said system includes a plurality of position sensors for sensing position of the occupant and wherein said step of determining in which of a plurality of discrete occupant position ranges the occupant's sensed position falls is based on outputs from said plurality of position sensors.

29. The method of claim 28 wherein said step of determining occupant position range includes the steps of determining an occupant position range from the vehicle dashboard and determining an occupant position range from the occupant seat back.

30. The method of claim 29 further including the steps of sensing position of the occupant seat and adjusting the determined occupant position ranges based upon the sensed seat position.

31. The method of claim 18 wherein said step of sensing occupant weight includes mounting a plurality of occupant weight sensors to a vehicle and establishing an occupant weight range based upon each weight sensor and establishing a priority weight range upon the occurrence of a discrepancy in weight ranges established from said weight sensors.

32. The method of claim 18 wherein said step of sensing occupant position includes mounting a plurality of occupant position sensors to a vehicle and establishing an occupant position range based on each position sensor and establishing a priority position range upon the occurrence of a discrepancy in position ranges established from said position sensors.

33. The method of claim 18 wherein said restraining system includes a seat belt and wherein said step of regulating includes regulating the operation of the seat belt.

34. An apparatus for controlling an occupant restraint system, said apparatus comprising:
position sensing means for sensing position of an occupant;
weight sensing means for sensing weight of the occupant;
regulating means operatively connected to an occupant restraining device of the occupant restraint system for regulating an occupant restraining function of said occupant restraining device in response to a control signal; and
control means operatively connected to said position sensing means, to said weight sensing means, and to said regulating means and including (i) means for determining in which of a plurality of discrete occupant weight ranges the occupant's sensed weight falls, and (ii) means for determining in which of a plurality of discrete occupant position ranges the occupant's sensed position falls, said means for determining in which of a plurality of discrete occupant position ranges the occupant's sensed position falls includes means for determining when the occupant is between 0% and about 10% of a maximum possible distance from the vehicle dashboard, when an occupant is more than about 10% and not more than about 30% of the maximum possible distance from the vehicle dashboard, when the occupant is more than about 30% and not more than about 60% of the maximum possible distance from the vehicle dashboard, and when the occupant is more than about 60% of the maximum possible distance from the vehicle dashboard, said control means further including a look-up table having a matrix of occupant characterization blocks, each occupant characterization block being defined by one of said weight ranges and one of said position ranges, said occupant characterization blocks being grouped to define said control zones, said control means selecting one of a plurality of discrete control zones dependant upon both said determined discrete occupant position range and said determined discrete occupant weight range of the occupant and providing said control signal based on the selected one of said discrete control zones.

35. An apparatus for controlling an occupant restraint system, said apparatus comprising:
position sensing means for sensing position of an occupant;
weight sensing means for sensing weight of the occupant, said weight sensing means having a weight sensor in the occupant seat;
seat back incline sensor for sensing an angle of seat back incline;
regulating means operatively connected to an occupant restraining device of the occupant restraint system for regulating an occupant restraining function of said occupant restraining device in response to a control signal; and
control means operatively connected to said position sensing means, to said weight sensing means, said seat back incline sensor, and to said regulating means for selecting one of a plurality of discrete control zones dependant upon both said sensed position and said sensed weight of the occupant and for providing said control signal based on the selected one of said discrete control zones, said control means further including means for compensating a value output from said weight sensing means as a function of an output from said seat back incline sensor.

36. A method for controlling an occupant restraint system comprising the step of:
sensing the position of an occupant;
sensing the weight of the occupant;
determining in which of a plurality of discrete occupant weight ranges the occupant's sensed weight falls;
determining in which of a plurality of discrete occupant position ranges the occupant's sensed position falls, the step of determining in which of a plurality of discrete occupant position ranges the occupant's sensed position falls includes the steps of determining if the occupant's position is between 0% and about 10% of a maximum possible distance from the vehicle dashboard, determining if the occupant's position is more than about 10% and not more than about 30% of the maximum possible distance from the vehicle dashboard, determining if the occupant's position is more than about 30% and not more than about 60% of the maximum possible distance from the vehicle dashboard, and determining if the occupant's position is more than about 60% of the maximum possible distance from the vehicle dashboard;
providing a look-up table having a matrix of occupant characterization blocks, each occupant characterization block being defined by one of said weight ranges and one of said position ranges, and grouping said occupant characterization blocks into said control zones;
regulating an occupant restraining function of said occupant restraint system in response to a control signal;
selecting one of a plurality of discrete predetermined control zones dependant upon both said determined discrete occupant position range and said determined discrete occupant weight range of the occupant; and
providing said control signal based on the selected one of said discrete control zones.

37. A method for controlling an occupant restraint system comprising the step of:
sensing the position of an occupant;
sensing the weight of the occupant, said step of sensing the weight of the occupant includes mounting a weight sensor in an occupant seat;
mounting a seat back incline sensor to the occupant seat;
regulating an occupant restraining function of said occupant restraint system in response to a control signal;
selecting one of a plurality of discrete predetermined control zones dependant upon both said sensed position and said sensed weight of the occupant; and
providing said control signal based on the selected one of said discrete control zones the step of providing said control signal further including the step of compensating a value output from said weight sensing means as a function of an output from said seat back incline sensor.

* * * * *